United States Patent
He

(10) Patent No.: US 11,067,478 B2
(45) Date of Patent: Jul. 20, 2021

(54) OPTICAL LOSS TESTING OF MULTI-FIBER ARRAY CABLES

(71) Applicant: EXFO Inc., Quebec (CA)

(72) Inventor: Gang He, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 16/776,692

(22) Filed: Jan. 30, 2020

(65) Prior Publication Data

US 2020/0249121 A1 Aug. 6, 2020

Related U.S. Application Data

(60) Provisional application No. 62/801,261, filed on Feb. 5, 2019.

(51) Int. Cl.
*G01M 11/00* (2006.01)

(52) U.S. Cl.
CPC ................................. *G01M 11/33* (2013.01)

(58) Field of Classification Search
None
See application file for complete search history.

(56) References Cited

U.S. PATENT DOCUMENTS

| | | | |
|---|---|---|---|
| 5,455,672 A * | 10/1995 | Lamonde | G01M 11/333 356/73.1 |
| 8,692,984 B2 | 4/2014 | Schell et al. | |
| 9,518,892 B1 | 12/2016 | Schell | |
| 9,749,043 B2 | 8/2017 | Perron | |
| 10,025,039 B1 | 7/2018 | Cummings et al. | |
| 10,139,274 B2 | 11/2018 | Schell et al. | |
| 2012/0019810 A1 * | 1/2012 | Wu | G02B 6/356 356/73.1 |
| 2012/0070154 A1 * | 3/2012 | Portier | H04B 10/0775 398/136 |
| 2012/0224168 A1 * | 9/2012 | Hirai | H04B 10/071 356/73.1 |
| 2016/0164601 A1 | 6/2016 | Perron | |
| 2016/0211643 A1 * | 7/2016 | Griseri | H01S 3/13013 |
| 2016/0248513 A1 * | 8/2016 | Saito | H04B 10/40 |
| 2017/0250752 A1 * | 8/2017 | Yuki | H04Q 11/0062 |
| 2018/0069627 A1 * | 3/2018 | Park | H04B 10/07957 |
| 2018/0335576 A1 * | 11/2018 | Farbert | G02B 6/43 |
| 2019/0170610 A1 * | 6/2019 | Perron | G01M 11/33 |
| 2019/0280767 A1 * | 9/2019 | Haber | H04J 14/02 |
| 2020/0064557 A1 * | 2/2020 | Miller | G01M 11/335 |
| 2020/0124498 A1 * | 4/2020 | Leclerc | G01D 5/35374 |
| 2020/0209108 A1 * | 7/2020 | Deng | G01M 11/332 |

OTHER PUBLICATIONS

Fluke Networks, Uncertainty of measurement (1 Jumper Reference)—MultiFiber Pro [online]. [retrieved on Apr. 16, 2019, available at least as of Sep. 6, 2018]. Retrieved from the Internet: <URL: https://ko.flukenetworks.com/knowledge-base/multifiber-pro/uncertainty-measurement-1-jumper-reference-multifiber-pro>.

* cited by examiner

*Primary Examiner* — Shawn Decenzo
(74) *Attorney, Agent, or Firm* — Helene Chotard

(57) ABSTRACT

There is provided an optical loss testing system for multi-fiber array cables an optical loss test method and a reference method therefor which overcomes at least part of the multi-powermeter uncertainty. A prior calibration step serves to characterize the relative difference in optical power response of the multiple power meters. This relative difference can then be used to correct the optical loss measurement so as to eliminate its effect.

16 Claims, 12 Drawing Sheets

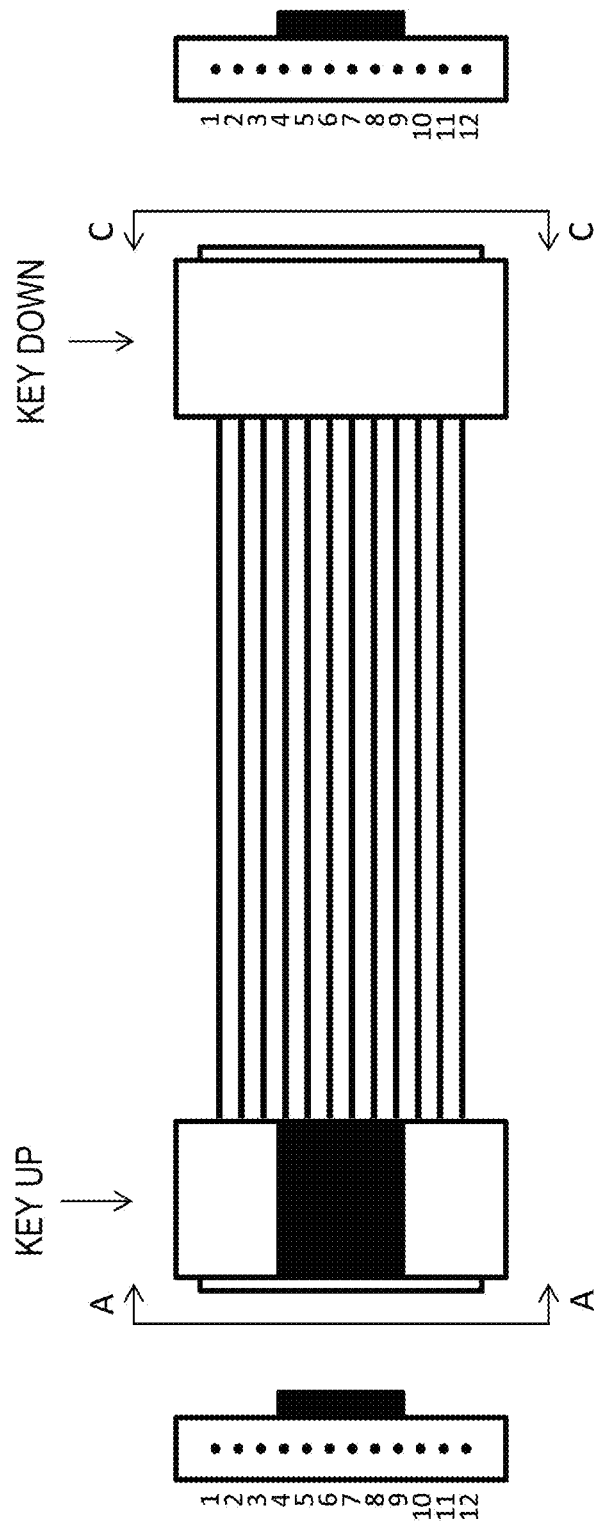

OPTICAL LOSS TESTING OF MULTI-FIBER ARRAY CABLES

TECHNICAL FIELD

The present description generally relates to optical loss testing of optical fiber links, and more particularly to testing the optical loss of multi-fiber array cables.

BACKGROUND

Optical power loss measurements are crucial for proper management of network communication systems. To this end, the Telecommunications Industry Association (TIA) and the American National Standards Institute (ANSI) established standard procedures for measuring power loss values using a light source and a power meter of single-fiber links (referred to as the Light Source Power Meter (LSPM) approach) (see, e.g. ANSI/TIA-526-7-A-2015 and ANSI/TIA-526-14-C-2015 Standards).

Multi-fiber array cables are widely employed nowadays in premises optical fiber cabling such as in data centers and other intrabuilding optical fiber networks, which require high connectivity density and versatile solutions. Multi-fiber array cables are mostly interconnected and connected to optical network equipment using MPO/MTP® connectors (MPO being the acronym for Multi-fiber Push-On/Pull-Off connectors and MTP a brand name). The most common MPO/MTP® connectors are configured in a 1×12 fiber array but there also exist 1×16, 2×12 and 2×16 fiber arrays as well as other configurations.

Multi-fiber array cables are also commonly employed in combination with duplex optical cabling and optical fiber transition modules. The position of receiving and transmitting optical fibers at a multi-fiber connector defines what is referred to in the industry as the polarity. Multi-fiber array system connectivity requires specific combinations of duplex patch cords, multi-fiber array cables and optical fiber transition modules in order to properly manage polarities. The TIA/EIA-568-C.3 Standard conveniently defines guidelines for maintaining fiber polarity in array systems. Because various multi-fiber array configurations are possible (i.e. duplex configuration, one-plug parallel configuration, two-plug one-row parallel configuration and one-plug two-row configuration, see TIA/EIA-568-C.3), various multi-fiber array cable types are defined by the TIA/EIA-568-C.3 Standard, each having a specific 1×12 or 2×12 fiber arrangement (i.e. Type A, Type B and Type C (1×12)). The multi-fiber array cable type or fiber arrangement is also referred to in the art as the "polarity" of the multi-fiber array cable or link. Other proprietary or custom multi-fiber array cabling systems also exist. Hence, deployment mistakes can easily occur if the appropriate arrangement of cable types is not followed (e.g. some cables are mixed up) which result in improper fiber polarity at the multi-fiber array connections.

There exist test systems (see e.g. U.S. Pat. No. 8,692,984 to Schell et al.) for optical loss and polarity testing of multi-fiber array cable links based on the Light Source Power Meter approach (LSPM). At one end of the link under test, a first test instrument comprises a light source and an optical switch or an array of light sources (LS_i), whereas at the other end, a second test instrument comprises an array of power meters (PM_i). Optical loss testing involves a power level reference step wherein the first and second test instruments are interconnected using one or more test cable jumpers of known polarity arrangement. Light sources and power meters are therefore referenced in pairs such that a single correspondence of light sources and power meters is referenced (LS_1 referenced with PM_1, LS_2 referenced with PM_2, . . . LS_n referenced with PM_n). Optical loss and polarity testing can then be performed by replacing the test cable jumper(s) with the multi-fiber array cable link under test or inserting the multi-fiber array cable link under test in line with the test cable jumper(s). However, because the polarity arrangement of the multi-fiber array cable link under test may vary and is not known a priori, the correspondence of light sources and power meters used for the measurement may differ from that of the reference. Any relative difference in optical power response among the multiple power meters may then introduce a reference uncertainty which manifests as an optical loss measurement uncertainty, referred to as herein as the multi-powermeter uncertainty. In practice, this optical loss measurement uncertainty that is being caused by the use of multiple power meters may typically reach about +/−0.3 dB, which may be unacceptable for some applications including premises optical fiber cabling testing.

There therefore remains a need for an optical loss testing method that is compatible with varying polarity arrangements of multi-fiber array cables.

SUMMARY

There is provided an optical loss testing system for multi-fiber array cables, an optical loss test method and a reference method therefor which overcomes at least part of the multi-powermeter uncertainty. A prior calibration step serves to characterize the relative difference in optical power response of the multiple power meters. This relative difference can then be used to correct the optical loss measurement so as to eliminate its effect.

In one embodiment, a relative optical power response calibration is obtained by performing power measurements $P\_h$ at each of the n power meters $PM\_h$ (where h=1 to n) using a same light source LS that is assumed to remain stable during the calibration process or which power level fluctuations are monitored and compensated via an integrated monitoring power meter. A relative optical power response factor $RRF\_h$ is obtained for each power meter $PM\_h$ by calculating an optical power response difference relative to a master power meter $PM\_M$, e.g., one of the n power meters:

$$RRF\_h = P\_h/P\_M$$

where $P\_M$ is the power measurement obtained with the master power meter $PM\_M$.

Once the relative optical power response calibration step is completed, the optical loss measurement process may be performed as known in the art, including the power level reference step, and be corrected to account for the relative optical power response factor.

In accordance with one aspect, there is provided an optical loss test method for testing a multi-fiber array cable link under test having a polarity arrangement, using a first test instrument having a first multi-fiber test interface, and a second test instrument having a second multi-fiber test interface and a plurality of power meters associated with respective fiber positions of the second multi-fiber test interface, the test method comprising:

obtaining relative optical power response factors $RRF\_k$ and $RRF\_j$, relative to a master power meter, respectively for power meters $PM\_k$ and $PM\_j$ of said plurality of power meters;

obtaining a reference power value Pref_k for said power meter PM_k, when position i on the first multi-fiber test interface is connected to position k on the second multi-fiber test interface either directly or via one or more multi-fiber array cable jumpers;

measuring an optical power P_j at power meter PM_j among the plurality of power meters, when position i on the first multi-fiber test interface is connected to position j on the second multi-fiber test interface via at least said multi-fiber array cable link under test;

from optical power P_j and reference power value Pref_k, deriving an uncorrected value IL_ij of optical loss for a fiber light path F_ij of the multi-fiber array cable link associated with position j on said second multi-fiber test interface;

deriving a corrected value ILc_ij of optical loss for said fiber light path as:

$$ILc\_ij = IL\_ij + (RRF\_j - RRF\_k).$$

In one embodiment, the method further comprises: measuring reference power value Pref_k for power meter PM_k when position i on the first multi-fiber test interface is connected to position k on the second multi-fiber test interface either directly or via one or more multi-fiber array cable jumpers.

In one embodiment, said polarity arrangement of said multi-fiber array cable link under test is not a priori known.

In one embodiment, test light is launched towards a plurality of positions of said first multi-fiber test interface, a single one of the positions at a time, and the method further comprises deriving the position k associated with the reference power value Pref_k from the position i of the plurality of positions of said first multi-fiber test interface where light is launched when the optical power P_j is measured at power meter PM_j.

In one embodiment, relative optical power response factors RRF_k are received for each position of the second multi-fiber test interface; and wherein the steps of measuring a reference power value Pref_k, measuring an optical power P_j, deriving an uncorrected value IL_ij of optical loss and deriving a corrected value of optical loss ILc_ij are repeated for each position j of the second multi-fiber test interface.

In one embodiment, the method further comprises deriving a polarity arrangement of said multi-fiber array cable link under test at least from a position j corresponding to the power meter PM_j on which optical power is detected when test light is launched towards position i of said first multi-fiber test interface.

In accordance with another aspect, there is provided a relative optical power response calibration method for testing a multi-fiber array cable link under test having a polarity arrangement, using a test instrument having a multi-fiber test interface and a plurality of power meters associated with respective fiber positions of the second multi-fiber test interface, the calibration method comprising:

connecting a light source towards each of said power meters, one at a time, and measuring a corresponding optical power P_h for each said power meters;

calculating and storing a relative optical power response factor RRF_h relative to a master power meter, for each power meter PM_h of said power meters by calculating a ratio of an optical power P_M measured at the master power meter to the optical power P_h measured at power meter PM_h;

wherein the master power meter is the same for each said relative optical power response factor RRF_h.

In one embodiment, said master power meter is one of said plurality of power meters of said test instrument.

In accordance with yet another aspect, there is provided a test system for testing an optical loss of a multi-fiber array cable link under test having a polarity arrangement, the system comprising:

a first test instrument having:
    a first multi-fiber test interface comprising a plurality of fiber positions; and
    at least one light source configured to launch test light towards the fiber positions of the first multi-fiber test interface, and a second test instrument having:
    a second multi-fiber test interface comprising a plurality of fiber positions; and
    a plurality of power meters associated with respective ones of the fiber positions of the second multi-fiber test interface;

a processing unit configured for:
  a. obtaining relative optical power response factors RRF_k and RRF_j, relative to a master power meter, respectively for power meters PM_k and PM_j of said plurality of power meters;
  b. obtaining a reference power value Pref_k for said power meter PM_k, when position i on the first multi-fiber test interface is connected to position k on the second multi-fiber test interface either directly or via one or more multi-fiber array cable jumpers;
  c. obtaining an optical power P_j measured at power meter PM_j among the plurality of power meters, when position i on the first multi-fiber test interface is connected to position j on the second multi-fiber test interface via at least said multi-fiber array cable link under test;
  d. from optical power P_j and a reference power value Pref_k, deriving an uncorrected value IL_ij of optical loss for a fiber light path F_ij of the multi-fiber array cable link associated with position j on said second multi-fiber test interface;
  e. deriving a corrected value ILc_ij of optical loss for said fiber light path F_ij as:

$$ILc\_ij = IL\_ij + (RRF\_j - RRF\_k). \qquad \text{i.}$$

In one embodiment, the processing unit is further configured for: measuring a reference power value Pref_k for power meter PM_k of said power meters, when position i on the first multi-fiber test interface is connected to corresponding position k on the second multi-fiber test interface either directly or via one or more multi-fiber array cable jumpers.

In one embodiment, the at least one light source is configured to launch test light towards a plurality of positions of the first multi-fiber test interface. The at least one light source may be configured to launch test light towards a single one of the positions at a time.

In one embodiment, said first test instrument comprises an optical switch configured to launch light from said light source towards successive ones of the plurality of positions of said first multi-fiber test interface.

In one embodiment, said polarity arrangement of said multi-fiber array cable link under test is not a priori known.

In one embodiment, wherein the light source is configured to launch test light towards a plurality of positions of said first multi-fiber test interface, a single one of the positions at a time, and wherein the processing unit is further configured for deriving the position k associated with the reference power value Pref_k from position i of the plurality of positions of said first multi-fiber test interface where light is launched when the optical power P_j is measured at power meter PM_j.

In one embodiment, relative optical power response factors RRF_h are received for each position of the second multi-fiber test interface; and wherein the steps of measuring a reference power value Pref_k, measuring an optical power P_j, deriving an uncorrected value IL_ij of optical loss and deriving a corrected value of optical loss ILc_ij are repeated for each position j of the second multi-fiber test interface.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

BRIEF DESCRIPTION OF THE DRAWINGS

FIG. 1 (prior art) comprises FIGS. 1A, 1B and 1C which are schematics illustrating a 1×12 multi-fiber array cable of the Type A as defined by the TIA/EIA-568-C.3 Standard, wherein FIG. 1A is a schematic near-end view of the multi-fiber array cable showing the front multi-fiber connector, FIG. 1B is a schematic top view of the multi-fiber array cable, and FIG. 1C is a schematic far-end view of the multi-fiber array cable showing the end multi-fiber connector;

FIG. 2 (prior art) comprises FIGS. 2A, 2B and 2C which are schematics illustrating a 1×12 multi-fiber array cable of the Type B as defined by the TIA/EIA-568-C.3 Standard, wherein

FIG. 3 (prior art) comprises FIGS. 3A, 3B and 3C which are schematics illustrating a 1×12 multi-fiber array cable of the Type C as defined by the TIA/EIA-568-C.3 Standard, wherein

FIG. 4 (prior art) comprises FIG. 4A and FIG. 4B which are schematics illustrating a 1×12 multi-fiber array fan-out cable of the Type A as defined by the TIA/EIA-568-C.3 Standard, wherein

It will be noted that throughout the drawings, like features are identified by like reference numerals.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

The TIA/EIA-568-C.3 Standard conveniently defines guidelines for maintaining fiber polarity in multi-fiber array systems. Because various multi-fiber array configurations are possible (i.e. duplex configuration, one-plug parallel configuration, two-plug one-row parallel configuration and one-plug two-row configuration, see TIA/EIA-568-C.3), various multi-fiber array cable types are defined by the TIA/EIA-568-C.3 Standard, each having a specific 1×12 or 2×12 fiber arrangement.

Figures 2A, 2B, 2C:
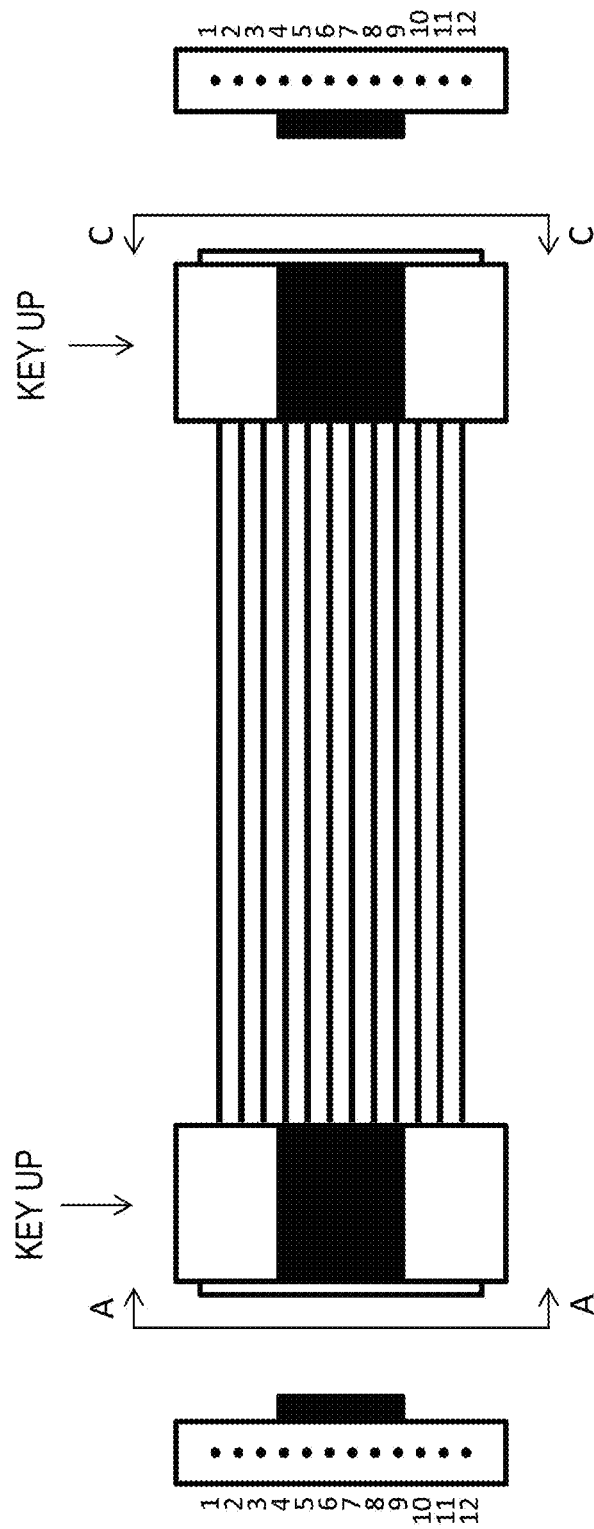
FIG. 2A is a schematic near-end view of the multi-fiber array cable showing the front multi-fiber connector.
FIG. 2B is a schematic top view of the multi-fiber array cable.
FIG. 2C is a schematic far-end view of the multi-fiber array cable showing the end multi-fiber connector.
Figures 3A, 3B, 3C:
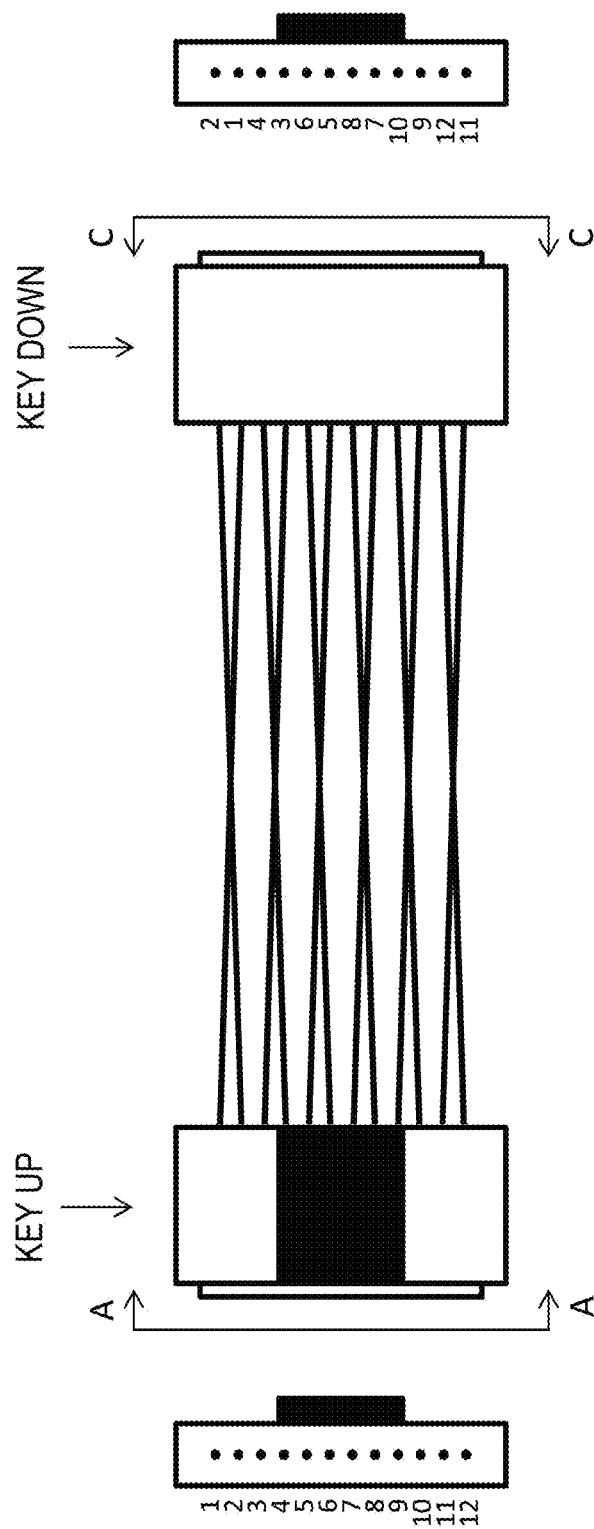
FIG. 3A is a schematic near-end view of the multi-fiber array cable showing the front multi-fiber connector.
FIG. 3B is a schematic top view of the multi-fiber array cable.
FIG. 3C is a schematic far-end view of the multi-fiber array cable showing the end multi-fiber connector.

Type A, Type B and Type C (1×12) multi-fiber array cables as defined by the Standard are illustrated in FIGS. 1, 2 and 3 respectively. Type A cables as defined by the Standard are designed with a key inversion (key-up to key-down) but no duplex pair twists between the input and output connectors. Type B cables are designed with no key inversion (key-up to key-up) and no duplex pair twists. Type C cables are designed with a key inversion (key-up to key-down) and with duplex pair twists. In multi-fiber array systems, combinations of different cable types may be required depending on the multi-fiber array configuration employed. Other proprietary or custom multi-fiber arrangements also exist. The multi-fiber array cable type or fiber arrangement is referred to herein as the "polarity arrangement" of a multi-fiber array cable or link.

Figures 4A, 4B:
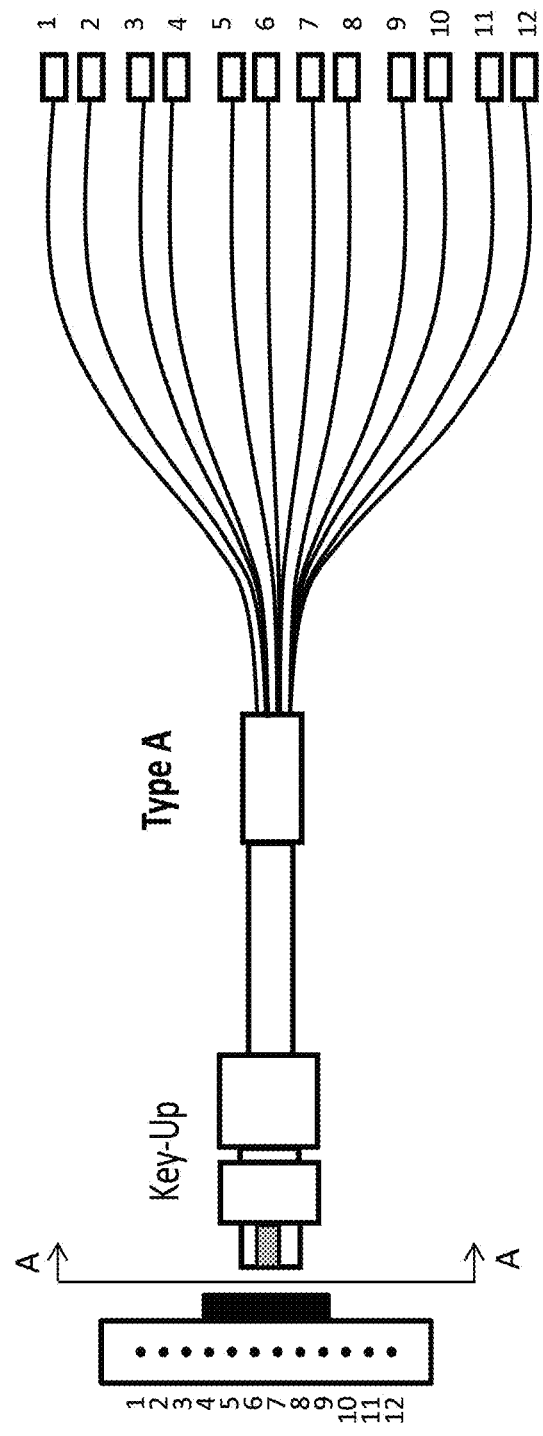
FIG. 4A is a schematic near-end view of the multi-fiber array fan-out cable showing the front multi-fiber connector and FIG. 4B is a schematic top view of the multi-fiber array fan-out cable.

Fan-out cables (also known in the industry as breakout cables or optical fiber transition modules) are used for interconnections within multi-fiber array systems. FIG. 4 illustrates the most common type (Type A) of optical fiber transition module comprising at one end, a multi-fiber array connector, and at the other end, a plurality of single-fiber connectors.

Figure 5:
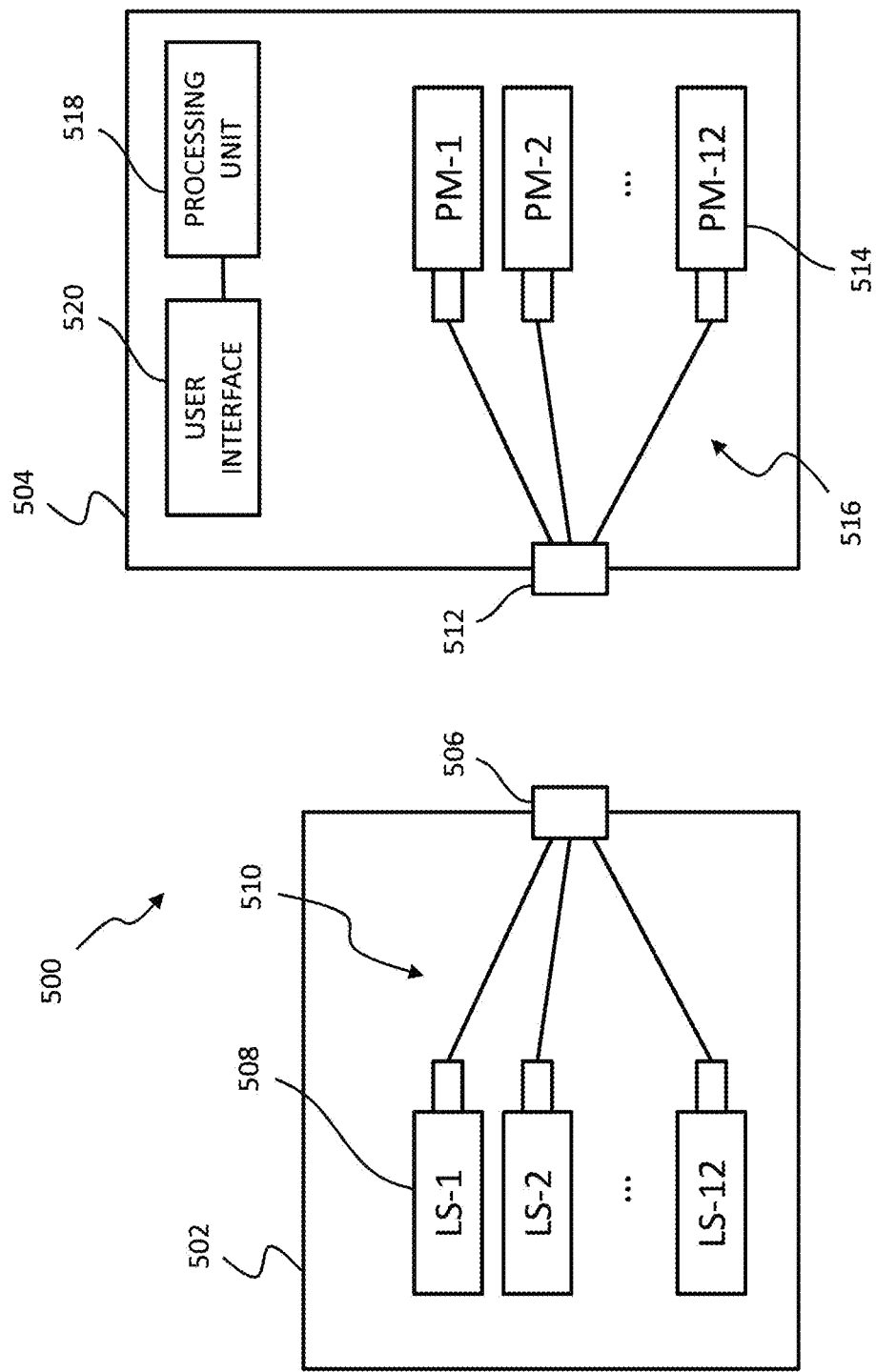
FIG. 5 is a block diagram illustrating a test system for testing optical loss of a multi-fiber array cable link based on the Light Source Power Meter approach (LSPM), in accordance with one embodiment.

FIG. 5 shows an example of a test system 500 for testing optical loss of a multi-fiber array cable link based on the Light Source Power Meter approach (LSPM) and comprising a multi-powermeter configuration. The test system comprises a first test instrument 502 and a second test instrument 504.

The first test instrument 502 comprises a first multi-fiber test interface 506 comprising a plurality of fiber positions (not shown). The first test instrument 502 further comprises a plurality of light sources 508 (LS-1 to LS-12) configured to launch test light towards respective fiber positions of the first multi-fiber test interface 506. In this embodiment, the first test instrument 502 comprises an integrated fan-out cable 510 used to interconnect each of the light sources 508 to one fiber position on the first multi-fiber test interface 506. In this case, the first multi-fiber test interface 506 comprises a multi-fiber array connector adapted to connect towards a multi-fiber array cable under test.

The second test instrument 504 comprises a second multi-fiber test interface 512 comprising a plurality of fiber positions (not shown). The second test instrument 504 further comprises a plurality of power meters 514 (PM-1 to PM-12) associated with respective ones of the fiber positions of the second multi-fiber test interface 514. In this embodiment, the second test instrument 504 comprises an integrated fan-out cable 516 used to interconnect the fiber positions on the second multi-fiber test interface 512 to respective power meters 514. In this case, the second multi-fiber test interface 512 comprises a multi-fiber array connector adapted to connect towards a multi-fiber array cable under test.

The second test instrument 504 further comprises a processing unit 518 used, e.g. to record measurements from the power meters 514 and implement steps of an optical loss test method to derive optical loss for individual fiber light paths of a multi-fiber array cable link, as described hereinbelow. The second test instrument 504 may further comprise a user interface 520 to provide status indicators to a user of the test instrument and/or receive commands from the user to start/stop/store measurements.

Although the first and second test instruments 502, 504 of FIG. 5 both comprise an integrated fan-out cable 510, 516, in other embodiments, the fan-out cables 510, 516 may not be part of the test instruments 502, 504 and be connected thereto as part of the optical loss test method. In this case, the first and second multi-fiber test interfaces 506, 512 may take the form of a plurality of single or duplex fiber connectors. Such embodiments may be used to allow adapting different keying/gender options and connector types (e.g. PC or APC) by selecting the adapted fan-out cables 510, 512. Alternatively, the first and/or second multi-fiber test interfaces 506, 512 may comprise a gender-changeable connector (e.g. pin/hole) or a hybrid (MPO/MPO) receive jumper cable may be connected to the first and/or second multi-fiber test interfaces 506, 512 for adapting to different keying/gender options and connector types (e.g. PC or APC).

As known in the art, the power meters 514 may be implemented as fiber pigtailed detectors. The fan-out cables 510, 516 may be made of fibers having substantially the same optical characteristics (i.e. numerical aperture and core diameter) as those of the multi-fiber array cable link to be tested (same fiber type). However, in this case, insertion loss associated with the second multi-fiber test interfaces 512 may introduce an optical loss measurement uncertainty. Accordingly, in other embodiments, the second fan-out cable 516 may be made of fibers having a core diameter and/or numerical aperture that are larger than those of the multi-fiber array cable link to be tested and the power meters 514 be implemented as large area detectors. This configuration ensures collection by the second fan-out cable 516 and measurement by the power meters 514 of all light exiting the first multi-fiber test interface 510 in the power reference step and all light exiting the multi-fiber array cable link under test in the optical power measurement step. The power reference method being applied may be adapted accordingly. The fan-out cable 510 typically comprises fibers having substantially the same optical characteristics (i.e. numerical aperture and core diameter) as those of the multi-fiber array cable link to be tested.

For polarity detection, the light sources of the first test instrument 502 may be configured to launch test light towards a plurality of positions of the first multi-fiber test interface, in sequence, so that the fiber position(s) where light is detected at the second instrument 504 is indicative of the polarity arrangement of the multi-fiber array cable link under test. In one embodiment where a fiber-by-fiber mapping of the polarity arrangement is to be characterized, test light may be launched towards a single one of the fiber positions at a time. For example, activation of the plurality of light sources 508 may be made in sequence. Polarity detection can be achieved by associating the fiber position on the second multi-fiber test interface 512 where test light is being received with each different fiber position on the first multi-fiber test interface 506 where test light is launched.

Furthermore, if the polarity arrangement is known to correspond to one of a finite number of polarity types (e.g. Type A, Type B or Type C), it is possible to launch test light on sub-groups of fiber positions and still be able to determine the polarity type from the positions corresponding to the power meters on which optical power is then detected.

It should however be noted that, e.g., if the polarity arrangement of the multi-fiber array cable link under test is known and does not need to be verified, test light can be launched simultaneously towards all the fiber positions.

Furthermore, the test light may be otherwise coded, e.g., in wavelength or time modulated, so as to allow polarity detection while simultaneously launching test light towards all the fiber positions.

Figure 6:
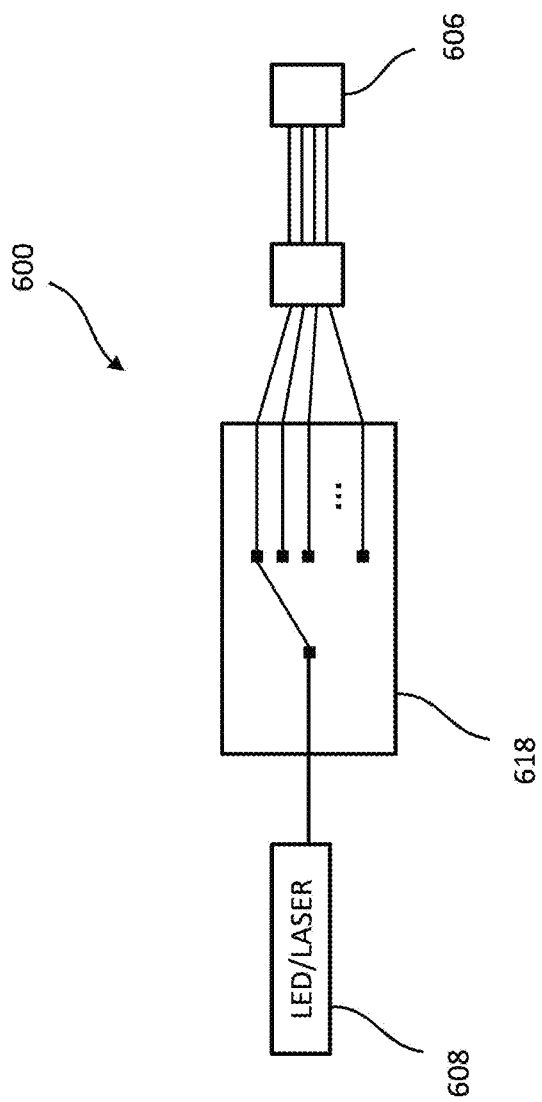
FIG. 6 is a block diagram illustrating a first test instrument for testing optical loss of a multi-fiber array cable link, in accordance with another embodiment comprising an optical switch.

FIG. 6 shows an optical configuration of a first test instrument 600 in accordance with another embodiment comprising an optical switch 618. The first test instrument 600 has a single light source 608 from which test light is launched towards a selected one of the fiber positions of a first multi-fiber test interface 606 using the optical switch 618. For example, test light may be launched in sequence from one fiber positions to another.

Figure 7:
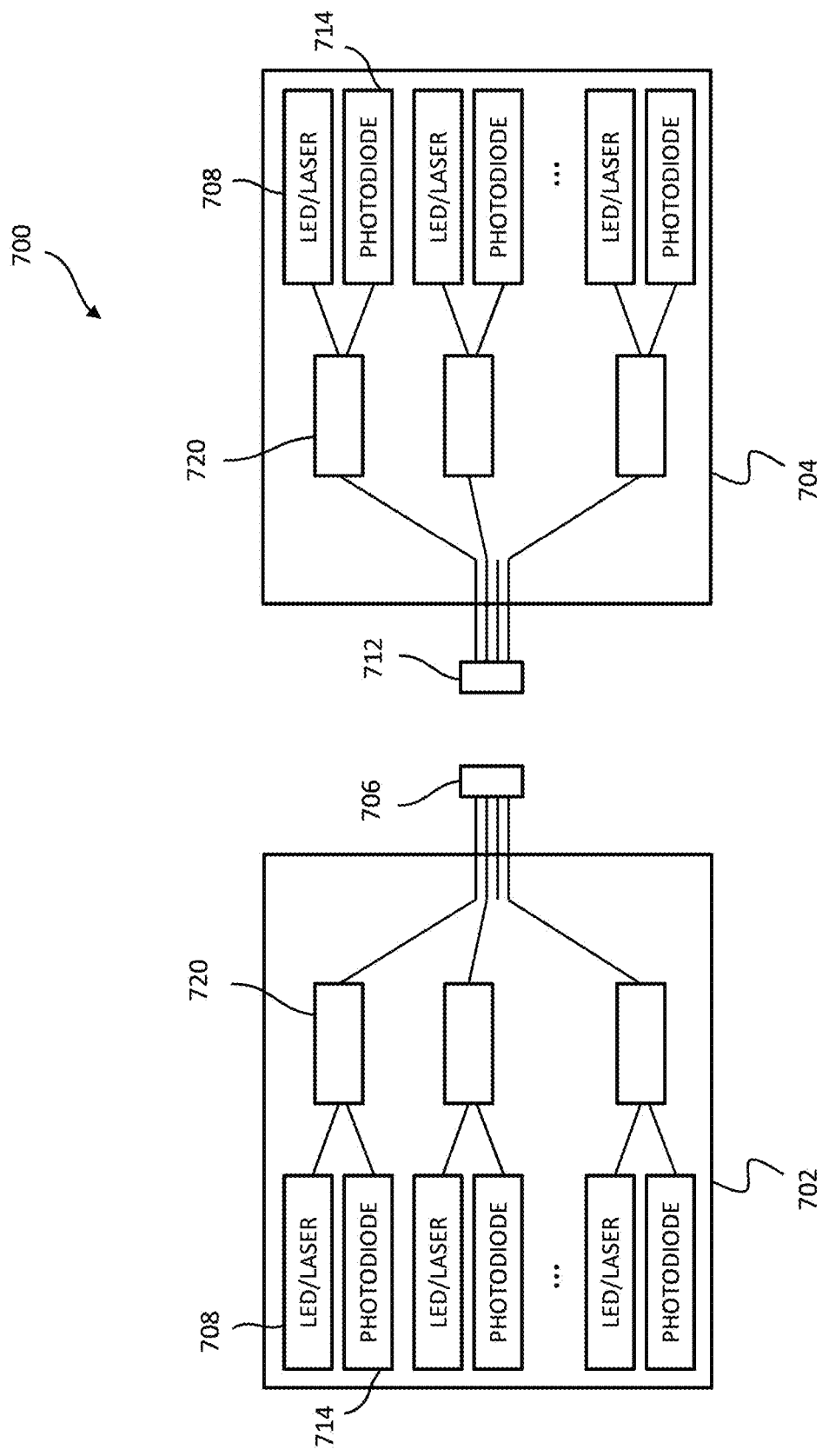
FIG. 7 is a block diagram illustrating a test system for testing optical loss of a multi-fiber array cable link, in accordance with another embodiment adapted for bi-directional optical loss testing.

FIG. 7 shows another example of a test system 700 is accordance with yet another embodiment adapted for bi-directional optical loss testing. In this embodiment, the second test instrument 704 is a duplicate of the first test instrument 702 and both test instruments 702, 704 comprise both light source and power meter functionalities, in what is referred to in the industry as optical loss test sets. Each fiber position of the multi-fiber test interface 706 is optically coupled to both a light source 708 and a power meter 714 using 1×2 optical splitter 720.

Communication between the first and second test instruments may be required to coordinate the test sequence such that the second test instrument knows in which fiber position the first test instrument launched a test light. Such communication may be implemented as known in the art via the multi-fiber array cable link connected between the two test instruments (cable jumper(s) or link under test) or via any other separate communication means such as wireless communication for example. A light source sequence or coding may also be implemented such that no communication is required between the test instruments.

A test method for testing a multi-fiber array cable link under test is described below with reference to FIGS. 8, 9, 10 and 11, which may comprise a calibration process for obtaining a relative optical power response calibration used in the test method to correct optical loss measurements. Although the test method is described herein as applied to unidirectional test instruments such as those described with reference to FIGS. 5 and 6, it is understood that the method can equivalently be applied to a bi-directional test instrument such as that described with reference to FIG. 7.

Figure 8:
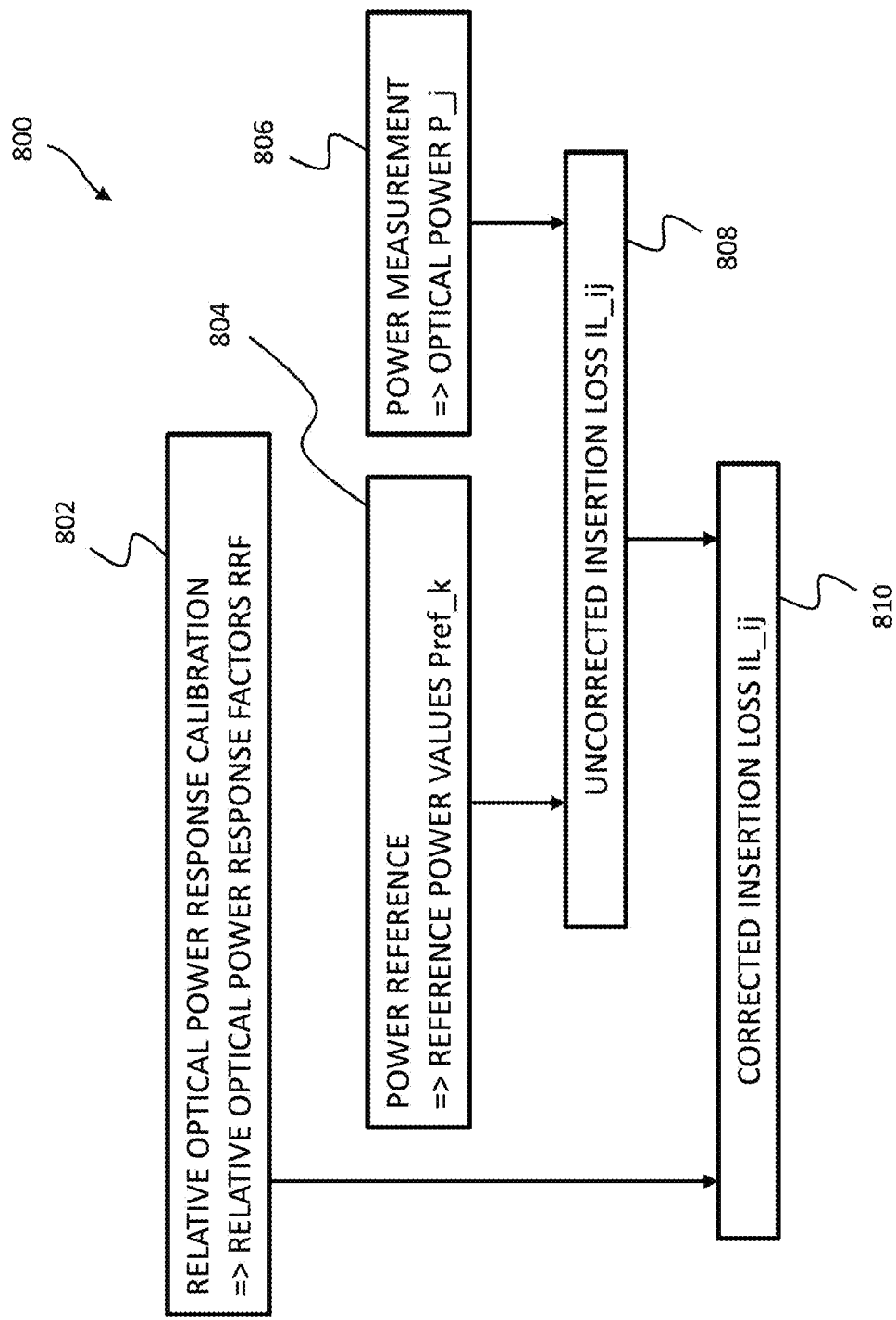
FIG. 8 is a flow chart illustrating a method for testing a multi-fiber array cable link under test.

FIG. 8 illustrates an optical loss test method 800 for testing a multi-fiber array cable link under test, in accordance with one embodiment. The test method 800 employs a first test instrument having a first multi-fiber test interface, and a second test instrument having a second multi-fiber test interface and a plurality of power meters associated with respective fiber positions of the second multi-fiber test interface.

In step 802, relative optical power response factors RRF_k and RRF_j are obtained, relative to a master power meter, at least for power meters k and j of the plurality of power meters. In practice, relative optical power response factors RRF may be obtained for each power meter PM_k, where k is a number between 1 to N and wherein N represents the number of fiber positions on the second multi-fiber test interface. For example, the relative optical power response factors RRF may be retrieved from memory as having been determined using the relative optical power response calibration method calibration process described herein below.

It is noted that, contrary to a power level reference as prescribed by ANSI/TIA-526-7-A-2015 and ANSI/TIA-526-14-C-2015 Standards, the relative optical power response factors RRF are assumed to remain stable over a relatively long period of time such as months or years for a given temperature range. As such, the relative optical power response calibration process need not be repeated for each new optical loss measurement and may be determined in factory and saved in memory for later use.

The relative optical power response calibration method is now described with reference to FIGS. 9A and 9B. The relative optical power response calibration method involves connecting a calibration light source 550 towards each power meter 514 of the second test instrument, one at a time, and measuring the corresponding optical power P_h for each power meter 514.

Figures 9A, 9B:
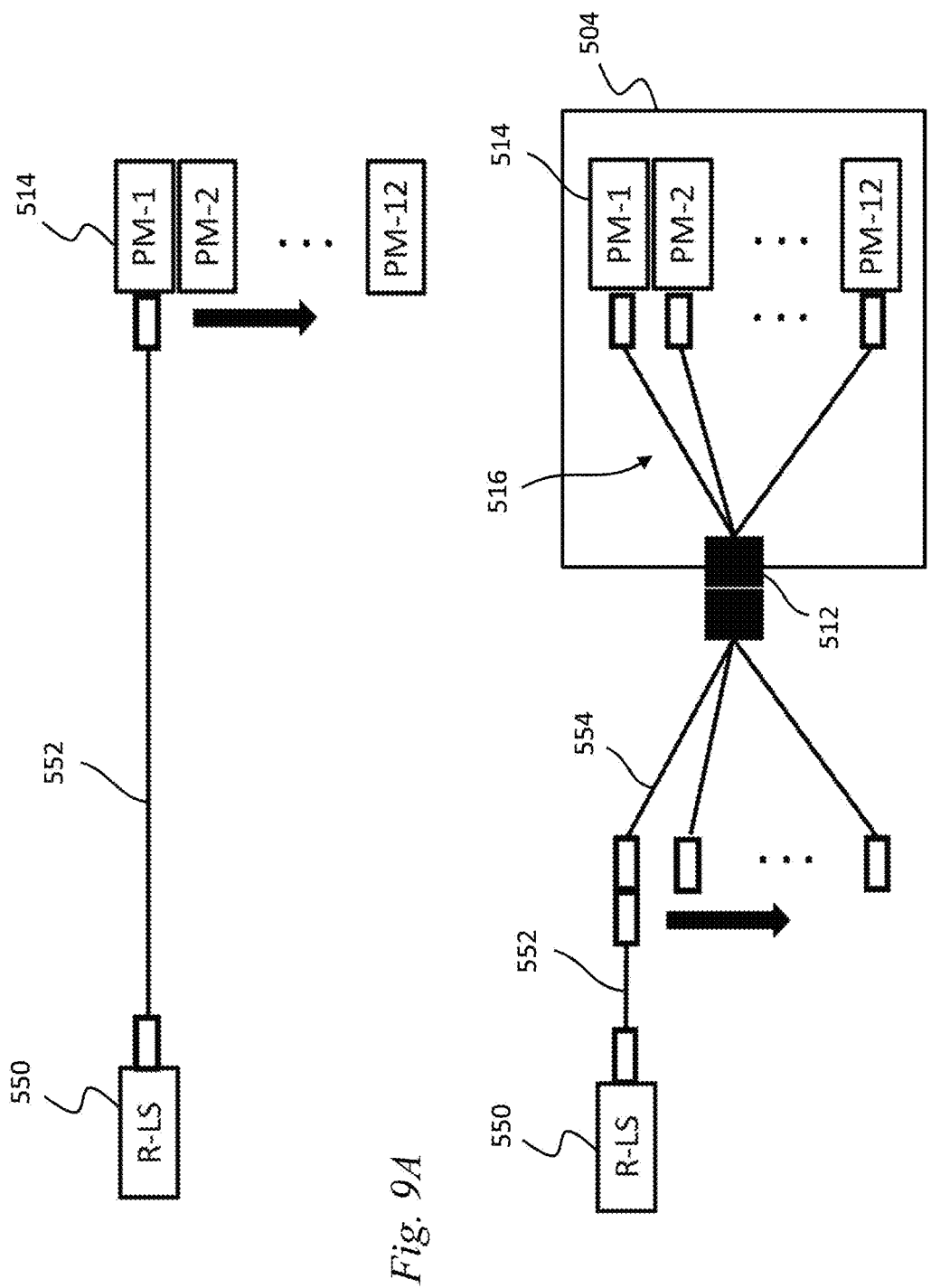
FIG. 9A is a block diagram illustrating a relative optical power response calibration method, in accordance with one embodiment wherein the same calibration light source is connected in sequence toward each power meter.
FIG. 9B is a block diagram illustrating a relative optical power response calibration method, in accordance with another embodiment wherein the same calibration light source is connected in sequence toward each power meter via single-fiber inputs of a fan-out cable.

FIG. 9A illustrates a relative optical power response calibration method in accordance with one embodiment. In FIG. 9A, the same calibration light source 550 and optional single-fiber launch cord 552 are connected in sequence to each power meter 514 and the corresponding optical power P_h is measured on each power meter 514. Such measurement is possible when a single fiber connector interface is accessible for each power meter. For example, such method may be suitable for embodiments where the fan-out cable 516 is not integrated with the second test instrument 504 or, if the fan-out cable 516 is integrated, for factory calibration by applying the method before the fan-out cable 516 is connected to power meters 514.

FIG. 9B illustrates a relative optical power response calibration method in accordance with another embodiment. This method may be suitable for applications on test instruments 504 having an integrated fan-out cable 516. In FIG. 9B, the multi-fiber array end of a fan-out cable 554 is connected to the second test instrument 504 via the second multi-fiber test interface 512, thereby providing access to each power meter 514 via the single-fiber inputs of the fan-out cable 554. The same calibration light source 550 and optional single-fiber launch cord 552 are then connected in sequence to each single-fiber input of the fan-out cable 554 and the corresponding optical power P_h is measured on each power meter 514.

Advantageously, the use of a second fan-out cable 516 that is made of optic fibers having a core diameter and/or numerical aperture that are larger than those of fan-out cable 554 and of large-area power meters 514 will ensure collection and measurement of the total power exiting the fan-out cable 554 and will therefore minimize any potential optical power variation of test light as incident on the power meters 514 during the calibration process and thereby minimize calibration uncertainty.

From the measured optical power P_h, a relative optical power response factor RRF_h relative to a master power meter is calculated and stored, for each power meter 514. The master power meter may be arbitrarily selected as one of the power meters 514 of the second test instrument 504 or be any other separate power meter used specifically for the calibration process. The master power meter should however be the same for each calculated relative optical power response factor RRF.

In one embodiment, the master power meter is selected as PM_M among the power meters 514. The relative optical power response factors RRF_h are derived from a ratio of the optical power P_M measured at the master power meter to the optical power P_h measured at power meter PM_h:

$RRF\_h = P\_M / P\_h$ (in linear scale); or $RPF\_h$ (dB) $= P\_M$ (dBm) $- P\_h$ (dBm) (in logarithmic scale)

Of course, the process can be repeated for multiple wavelengths of operation, power levels and temperatures (monitored using an integrated temperature sensor).

It will be understood that in order to serve as a reference, the calibration light source 550 should remain substantially stable during the calibration process (at least within a given uncertainly requirement). In order to reduce any potential measurement uncertainty introduced by optical power level fluctuations of the calibration light source 550, a monitoring power meter may be integrated in the calibration light source 550.

Figure 10A:
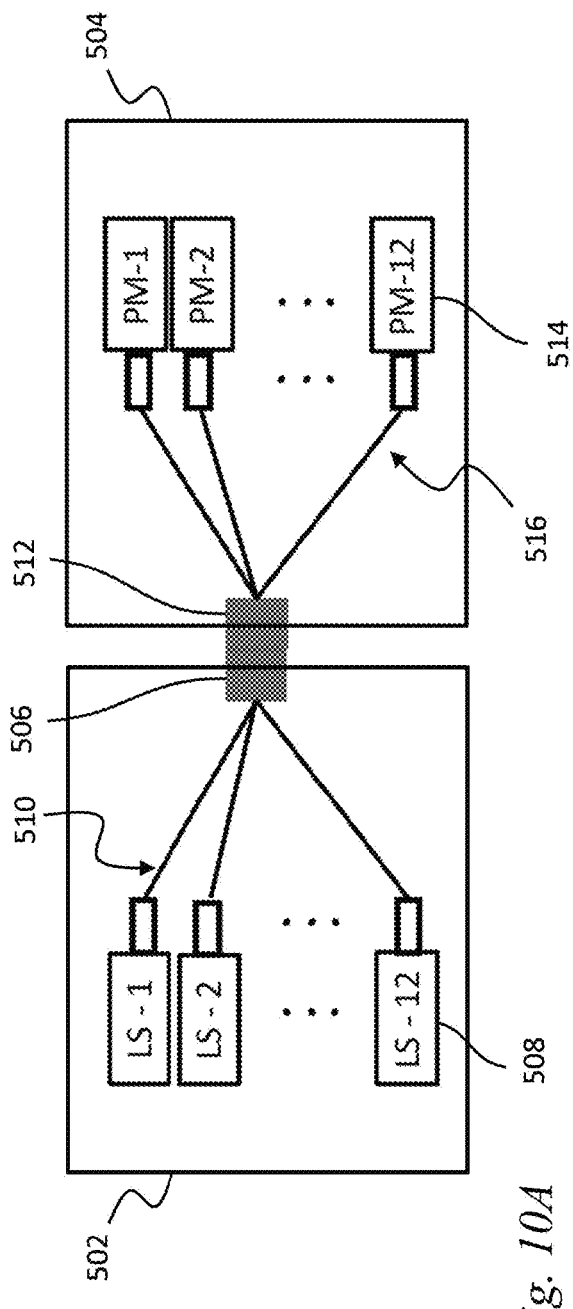
FIG. 10A is a block diagram illustrating a power reference step of the method of FIG. 8, in accordance with one embodiment analogous to a two-cord reference method.
Figure 10B:
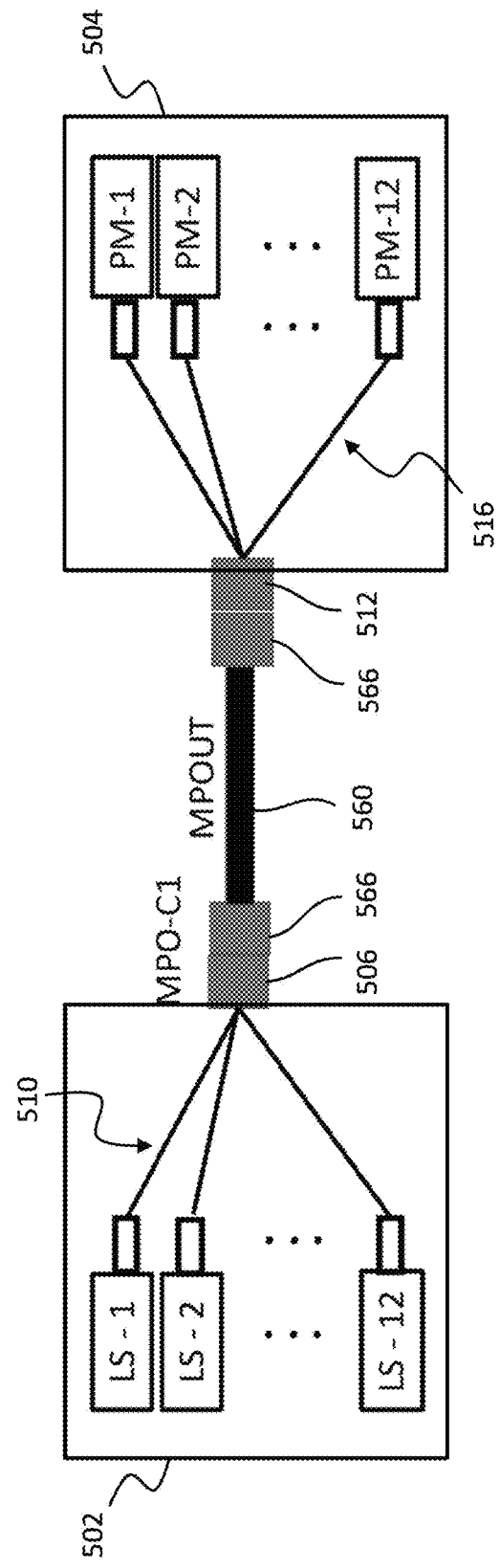
FIG. 10B is a block diagram illustrating an optical power measurement step of the method of FIG. 8, in accordance with one embodiment analogous to a two-cord reference method.

FIG. 10 illustrates an example of a power reference step (see FIG. 10A) and an optical power measurement step (see FIG. 10B).

Referring to FIG. 8 and FIG. 10A, in step 804, a reference power value Pref_k is obtained at least for power meter PM_k among the N power meters. In practice, a reference power value Pref_k may be obtained for each power meter 514. For example, the reference power value Pref_k may be retrieved from memory after having been measured using a power reference method as known in the art or as described herein below. A reference power value may have been obtained by connecting the first and second test instruments 502, 504 directly, via fan-out cords 510, 516 (in not integrated in the test instruments) or via one or more multi-fiber array cable jumpers between the first and second test instruments 502, 504 such that fiber position i on the first multi-fiber test interface 506 is connected to fiber position k on the second multi-fiber test interface 512.

Referring to FIG. 8 and FIG. 10B, in step 806, an optical power P_j is measured at power meter PM_j among the plurality of power meters 514 when at least the multi-fiber array cable link under test 560 is connected between the first and the second test instruments 502, 504, wherein j is a number between 1 to N and N represents the number of fiber positions on the second multi-fiber test interface 512. During the optical power measurement step 806, position i on the first multi-fiber test interface 506 is connected to position j on the second multi-fiber test interface 512.

Because the polarity arrangement of the multi-fiber array cable link under test may differ from that of the connection used in the power reference step 804 (e.g. polarity arrangement of multi-fiber array cable jumper(s) is different from that of the multi-fiber array cable link under test), the light source LS_i of the first test instrument 502 that was connected to power meter PM_k during the reference step 804, via position k on the second multi-fiber test interface 512, may now be connected to a different power meter PM_j, via position j on the second multi-fiber test interface 512. Accordingly, the reference power value Pref_k measured at power meter PM_k (and not that of power meter PM_j) should be used as the reference power value when deriving the optical loss IL_ij associated with a fiber light path F_ij of the multi-fiber array cable under test 560 (wherein the fiber light path F_ij is connected between position i on the first multi-fiber test interface 506 and position j on the second multi-fiber test interface 512).

In practice, the optical power P_j may be measured for each power meter PM_j.

FIG. 10 illustrates an example of a power reference step (see FIG. 10A) and an optical power measurement step (see FIG. 10B) that are embodied in accordance with the two-cord reference method described in the ANSI/TIA-526-14-C-2015 Standard (see Annex C). It will however be understood that the present test method is not limited to any specific reference method and that the three-cord reference method, the reference method described, e.g., in U.S. Pat. No. 9,749,043 to Perron, or any other suitable reference method may be applied as deemed appropriate for the specific application.

It is noted that the reference method illustrated in FIG. 10A may act as a one-cord or a two-cord reference as defined in the ANSI/TIA-526-14-C-2015 Standard depending on the diameter and numerical aperture of the optical fibers of the second fan-out cable 516. More specifically, if the second fan-out cable 516 is made of an optical fiber having a diameter and a numerical aperture that are substantially equal to those of the first fan-out cable 510, the reference method of FIG. 10A acts as a two-cord reference. However, in one embodiment, the second fan-out cable 516 may be chosen to be made of an optical fiber having a diameter and/or numerical aperture that is larger than that of the first fan-out cable 510 and the power meters be implemented as large area detectors. This embodiment has the practical advantage of effecting the second test instrument 504 (including the fan-out cable 516) to behave as a large area detector, the second multi-fiber test interface 512 then behaving as a direct input to a large area detector. Accordingly, there is no optical loss associated with the connection between the first multi-fiber test interface 506 and the second multi-fiber test interface 512 and the power reference is in fact equivalent to the one-cord reference method of the ANSI/TIA-526-14-C-2015 Standard. In this embodiment, the resultant power measurement accounts for the loss contribution of a single connector, i.e. between the first fan-out cable 510 and the multi-fiber array cable under test 560, in addition to the optical fiber path between end connectors 566 of the multi-fiber array cable under test 560.

Figure 11A:
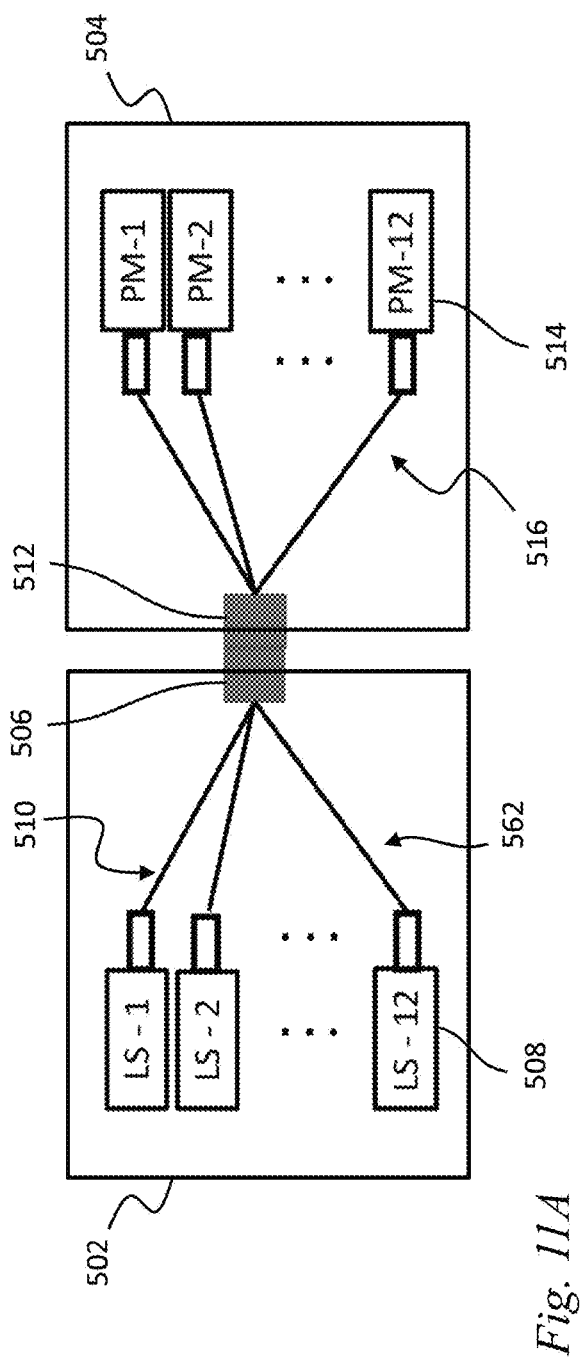
FIG. 11A is a block diagram illustrating a power reference step of the method of FIG. 8, in accordance with another embodiment analogous to a one-cord reference method.
Figure 11B:
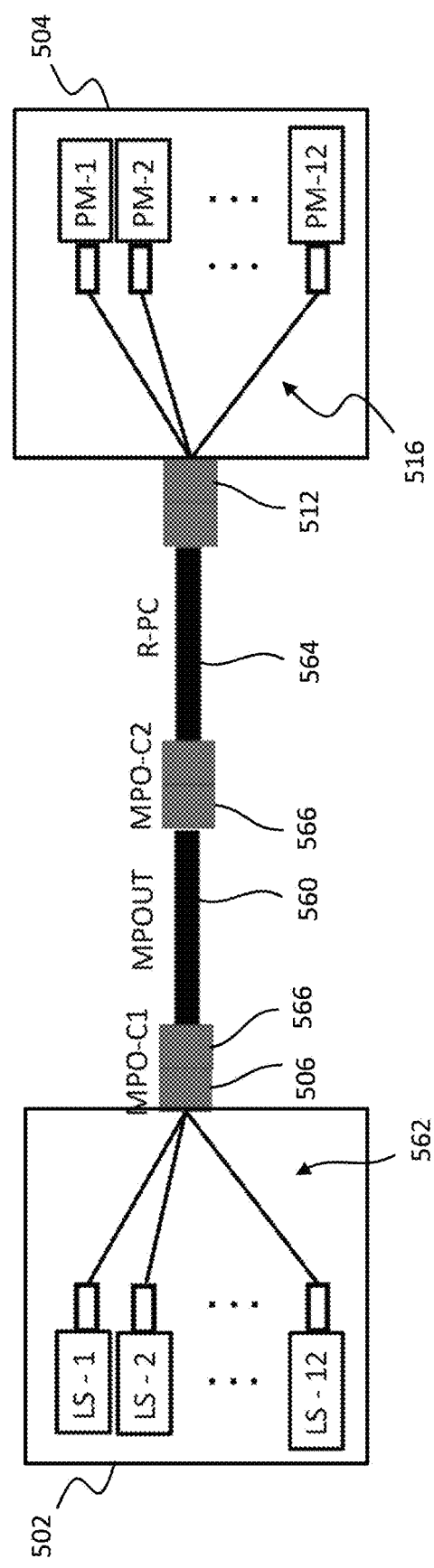
FIG. 11B is a block diagram illustrating an optical power measurement step of the method of FIG. 8, in accordance with another embodiment analogous to a one-cord reference method.

FIG. 11 illustrates another example of a power reference step (see FIG. 11A) and an optical power measurement step (see FIG. 11B) that are embodied in accordance with an application of the one-cord reference method described in the ANSI/TIA-526-14-C-2015 Standard (see Annex A). In FIG. 11, the fan-out cable 516 is made of an optical fiber having a diameter and/or numerical aperture that is larger than that of the first fan-out cable 510 and the power meters are implemented as large area detectors. This embodiment has the practical advantage of effecting the second test instrument 504 (including the fan-out cable 516) to behave as a large area detector. As shown in FIG. 11A, the one-cord power reference step 804 is performed by connecting the first and second test instruments 502, 504 via fan-out cords 510 and 516. The first fan-out cord 510 acts as the launch cord 562 of the one-cord reference method and the second fan-out cord 516 acts as the input of a large area detector. As shown in FIG. 11B, the power measurement step 806 is performed by connecting the multi-fiber array cable link under test 560 between the first test instrument 502 and a multi-fiber array receive cord 564 connected to the second test instrument 504. The multi-fiber array multi-fiber array receive cord 564 is made of an optical fiber having a diameter and a numerical aperture that are substantially equal to those of the first fan-out cable 510. As in the one-cord reference method of the ANSI/TIA-526-14-C-2015 Standard (Annex A), an optical loss value obtained with the method of FIG. 11 accounts for the loss contributions of both end connectors 566 of the multi-fiber array cable link under test 560, in addition to the optical fiber path between these connectors.

Back to FIG. 8, in step 808, an uncorrected value IL_ij of optical loss for fiber light path F_ij of the multi-fiber array cable link 560 is derived from optical power P_j and reference power value Pref_k obtained respectively in step 806 and step 804. In practice, an uncorrected value IL_ij of optical loss may be derived for each fiber light path of the multi-fiber array cable link 560. The uncorrected value IL_ij of optical loss is derived accordance with the elected reference method. For example, in accordance with the reference methods described in the ANSI/TIA-526-14-C-2015 Standard (see Annex C), the uncorrected value IL_ij of optical loss may be derived as follows:

$IL\_ij = P\_j/Pref\_k$ (in linear scale); or $IL\_ij$ (dB) $= P\_j$ (dBm) $- Pref\_k$ (dBm) (in logarithmic scale)

It will be understood that position k of the reference power value Pref_k is determined by the polarity arrangement of the multi-fiber array cable link under test 560 as well as that associated with the power reference step 804 (i.e. the polarity arrangement of the reference multi-fiber array cable jumper(s) if any). If the polarity arrangements are known, the mapping between position j and position k may be readily obtained. It will be understood that the position k of the reference power value Pref_k corresponds to the position reached by test light from position i on the first multi-fiber test interface 506 during the power reference step 804, wherein the position i corresponds to that from which test light originates when optical power P_j is measured on power meter PM_j during the power measurement step 806.

In step 810, a corrected value ILc_ij of optical loss for the fiber light path F_ij is derived by applying a correction to the uncorrected value IL_ij of optical loss as:

$$ILc\_ij = IL\_ij * RRF\_j / RRF\_k \text{ (in linear scale); or}$$

$$ILc\_ij \text{ (dB)} = IL\_ij \text{ (dB)} + RRF\_j \text{ (dB)} - RRF\_k \text{ (dB) (in logarithmic scale)}.$$

In practice, a corrected value IL_ij of optical loss may be derived for each fiber light path of the multi-fiber array cable link 560.

The method of FIG. 8 allows to remove or at least significantly reduce the optical loss measurement uncertainty that is induced by the relative difference in optical power response among the multiple power meters 514.

It will be understood that the polarity arrangement of the multi-fiber array cable link under test 560 may or may not be known a priori and that the measurement methods of FIGS. 8, 10 and 11 may further comprises a polarity detection step for detecting a polarity arrangement of the multi-fiber array cable link under test 560.

In one embodiment, the power measurement step 806 is performed by launching test light towards a plurality of positions of the first multi-fiber test interface 506, a single position at a time, e.g., by turning on the light sources 508 in sequence. The polarity arrangement of the multi-fiber array cable link under test 560 may then be obtained by recording the mapping of a position j associated with power meter PM_j with a position i on the first multi-fiber test interface 506 towards which test light is known to be launched, and this for each positions i and j. Once the polarity arrangement of the multi-fiber array cable link under test 560 is known and assuming that the polarity arrangement of the reference multi-fiber array cable jumper(s) (if any) is known or predetermined, the position k associated with the relevant reference power value Pref_k used in step 808 may be derived for each position j on which the optical power P_j is measured.

It will be understood by one of ordinary skill in the art that the processing unit described herein may be embodied by a computer, a microprocessor, a central processing unit (CPU), a microcontroller, or the like; and may be implemented in hardware, software, firmware or any combination thereof. It may be integrated, partially integrated or physically separate from the test instrument. In some implementations, it may form part of a computer system integrated in the test instrument.

The methods and systems described herein may be implemented using a computer program product in combination with the appropriate hardware. This computer program product may include a computer program made up of computer program code or instructions. The computer program code is often stored on storage media. This media can be a diskette, hard disk, CD-ROM, DVD-ROM, tape or a memory storage device or collection of memory storage devices such a read-only memory (ROM) or random-access memory (RAM).

Example of Test Instrument Architecture

Figure 12:
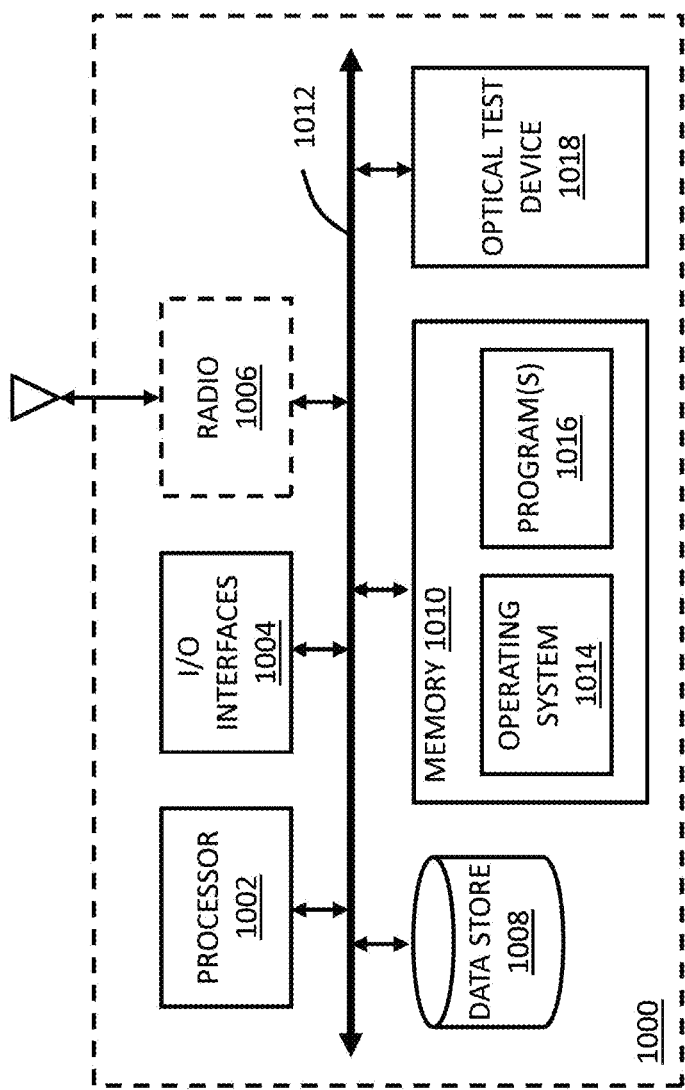
FIG. 12 is a block diagram illustrating an example architecture of a test instrument of the test system of FIG. 5.

FIG. 12 is a block diagram of a test instrument 1000 which may embody the second test instrument 502 of the system of FIG. 5 or either one or both test instruments 702 or 704 of the system of FIG. 7. The test instrument 1000 may comprise a digital device that, in terms of hardware architecture, generally includes a processor 1002, input/output (I/O) interfaces 1004, an optional radio 1006, a data store 1008, a memory 1010, as well as an optical test device 1018 including optical power meters 514 or 714. It should be appreciated by those of ordinary skill in the art that FIG. 12 depicts the test instrument 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the test instrument 1000 is in operation, the processor 1002 is configured to execute software stored within the memory 1010, to communicate data to and from the memory 1010, and to generally control operations of the test instrument 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the test instrument 1000 and/or output at least one of the values derived by the test instrument software.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication.

The data store 1008 may be used to store data, such as relative optical power response factors, reference power value and optical power values. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 10, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the test instrument 1000. For example, example programs 1016 may include a web browser to connect with a server for transferring measurement data files, a dedicated test application configured to implement the test method described herein by controlling optical power measurements by the optical test device and deriving corrected values of optical loss, and display a GUI related to the test instrument 1000.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the test instrument 1000 via the radio 106. In such cases, at least some of the programs 1016 may be located in a memory of such a mobile device, for execution by a processor of the physically distinct device. The mobile may then also include a radio and be used to transfer measurement data files toward a remote test application residing, e.g., on a server.

It should be noted that the test instrument shown in FIG. 12 is meant as an illustrative example only. Numerous types of computer systems are available and can be used to implement the test instrument.

The embodiments described above are intended to be exemplary only. The scope of the invention is therefore intended to be limited solely by the appended claims.

The invention claimed is:

1. A test system for testing an optical loss of a multi-fiber array cable link under test having a polarity arrangement, the system comprising,
   a first test instrument having:
   a first multi-fiber test interface comprising a plurality of fiber positions; and
   at least one light source configured to launch test light towards the fiber positions of the first multi-fiber test interface, and
   a second test instrument having:
   a second multi-fiber test interface comprising a plurality of fiber positions; and
   a plurality of power meters associated with respective ones of the fiber positions of the second multi-fiber test interface;
   a processing unit configured for:
   obtaining relative optical power response factors $RRF\_k$ and $RRF\_j$, relative to a master power meter, respectively for power meters $PM\_k$ and $PM\_j$ of said plurality of power meters;
   obtaining a reference power value $Pref\_k$ for said power meter $PM\_k$, when position i on the first multi-fiber test interface is connected to position k on the second multi-fiber test interface either directly or via one or more multi-fiber array cable jumpers;
   obtaining an optical power $P\_j$ measured at power meter $PM\_j$ among the plurality of power meters, when position i on the first multi-fiber test interface is connected to position j on the second multi-fiber test interface via at least said multi-fiber array cable link under test;
   from optical power $P\_j$ and reference power value $Pref\_k$, deriving an uncorrected value $IL\_{ij}$ of optical loss for a fiber light path $F\_{ij}$ of the multi-fiber array cable link associated with position j on said second multi-fiber test interface;
   deriving a corrected value $ILc\_{ij}$ of optical loss for said fiber light path $F\_{ij}$ as: $ILc\_{ij} = IL\_{ij} + (RRF\_j - RRF\_k)$.

2. The test system as claimed in claim 1, wherein the processing unit is further configured for: measuring a reference power value $Pref\_k$ for power meter $PM\_k$ of said power meters, when position i on the first multi-fiber test interface is connected to corresponding position k on the second multi-fiber test interface either directly or via one or more multi-fiber array cable jumpers.

3. The test system as claimed in claim 1, wherein the at least one light source is configured to launch test light towards a plurality of positions of the first multi-fiber test interface.

4. The test system as claimed in claim 3, wherein the at least one light source is configured to launch test light towards a single one of the positions at a time.

5. The test system as claimed in claim 4, wherein said first test instrument comprises an optical switch configured to launch light from said light source towards successive ones of the plurality of positions of said first multi-fiber test interface.

6. The test system as claimed in claim 1, wherein said polarity arrangement of said multi-fiber array cable link under test is not a priori known.

7. The test system as claimed in claim 6, wherein the light source is configured to launch test light towards a plurality of positions of said first multi-fiber test interface, a single one of the positions at a time, and wherein the processing unit is further configured for deriving the position k associated with the reference power value $Pref\_k$ from position i of the plurality of positions of said first multi-fiber test interface where light is launched when the optical power $P\_j$ is measured at power meter $PM\_j$.

8. The test system as claimed in claim 1, wherein relative optical power response factors $RRF\_h$ are received for each position h of the second multi-fiber test interface; and wherein the steps of measuring a reference power value Pref_k, measuring an optical power P_j, deriving an uncorrected value IL_ij of optical loss and deriving a corrected value of optical loss ILc_ij are repeated for each position j of the second multi-fiber test interface.

9. An optical loss test method for testing a multi-fiber array cable link under test having a polarity arrangement, using a first test instrument having a first multi-fiber test interface, and a second test instrument having a second multi-fiber test interface and a plurality of power meters associated with respective fiber positions of the second multi-fiber test interface, the test method comprising:
  obtaining relative optical power response factors RRF_k and RRF_j, relative to a master power meter, respectively for power meters PM_k and PM_j of said plurality of power meters;
  obtaining a reference power value Pref_k for said power meter PM_k, when position i on the first multi-fiber test interface is connected to position k on the second multi-fiber test interface either directly or via one or more multi-fiber array cable jumpers;
  measuring an optical power P_j at power meter PM_j among the plurality of power meters, when position i on the first multi-fiber test interface is connected to position j on the second multi-fiber test interface via at least said multi-fiber array cable link under test;
  from optical power P_j and reference power value Pref_k, deriving an uncorrected value IL_ij of optical loss for a fiber light path F_ij of the multi-fiber array cable link associated with position j on said second multi-fiber test interface;
  deriving a corrected value ILc_ij of optical loss for said fiber light path as: ILc_ij=IL_ij+(RRF_j−RRF_k).

10. The optical loss test method as claimed in claim 9, further comprising:
  measuring reference power value Pref_k for power meter PM_k when position i on the first multi-fiber test interface is connected to position k on the second multi-fiber test interface either directly or via one or more multi-fiber array cable jumpers.

11. The optical loss test method as claimed in claim 9, wherein said polarity arrangement of said multi-fiber array cable link under test is not a priori known.

12. The optical loss test method as claimed in claim 11, wherein test light is launched towards a plurality of positions of said first multi-fiber test interface, a single one of the positions at a time, and further comprising deriving the position k associated with the reference power value Pref_k from the position i of the plurality of positions of said first multi-fiber test interface where light is launched when the optical power P_j is measured at power meter PM_j.

13. The optical loss test method as claimed in claim 9, wherein relative optical power response factors RRF_k are received for each position of the second multi-fiber test interface; and wherein the steps of measuring a reference power value Pref_k, measuring an optical power P_j, deriving an uncorrected value IL_ij of optical loss and deriving a corrected value of optical loss ILc_ij are repeated for each position j of the second multi-fiber test interface.

14. The optical loss test method as claimed in claim 9, further comprising deriving a polarity arrangement of said multi-fiber array cable link under test at least from a position j corresponding to the power meter PM_j on which optical power is detected when test light is launched towards position i of said first multi-fiber test interface.

15. The optical loss test method as claimed in claim 9, further comprising a calibration step for measuring relative optical power response factors RRF_h for each said power meters, said calibration step comprising:
  connecting a light source towards each of said power meters, one at a time, and measuring a corresponding optical power P_h for each power meter PM_h of said power meters;
  calculating and storing a relative optical power response factor RRF_h relative to a master power meter, for each power meter PM_h of said power meters by calculating a ratio of an optical power P_M measured at the master power meter to the optical power P_h measured at power meter PM_h;
  wherein the master power meter is the same for each said relative optical power response factor RRF_h.

16. The optical loss test method as claimed in claim 15, wherein said master power meter is one of said plurality of power meters of said test instrument.

* * * * *